Oct. 6, 1931.   L. B. WINTON   1,825,840
MEANS FOR PERFORATING CONTAINERS
Filed Jan. 25, 1930
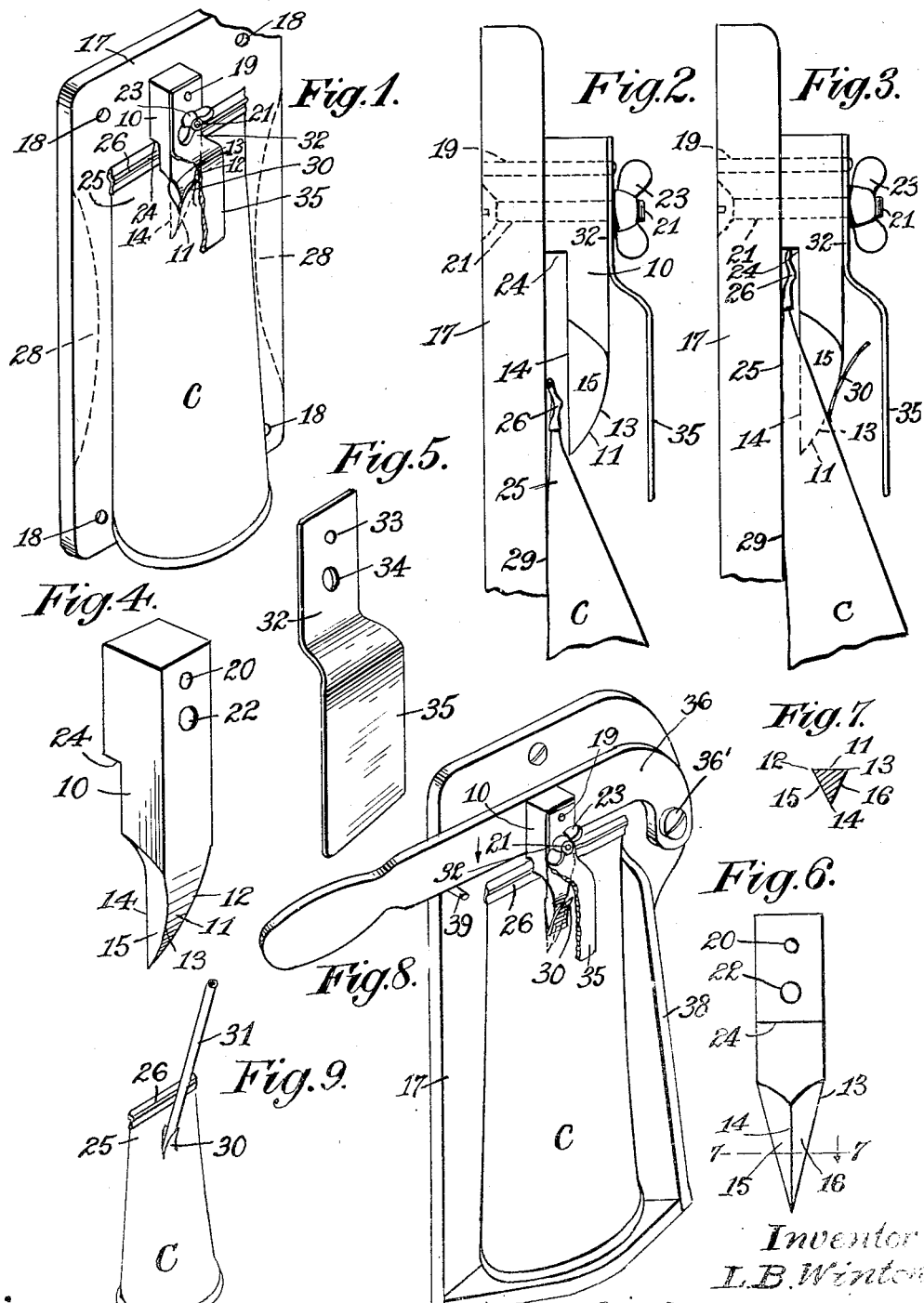
Inventor
L. B. Winton
By his Attorney
John O. Seifert Patented Oct. 6, 1931

1,825,840

UNITED STATES PATENT OFFICE

LEWIS B. WINTON, OF GREENWICH, CONNECTICUT, ASSIGNOR, BY MESNE ASSIGNMENTS, TO AMERICAN SEALCONE CORPORATION, OF NEW YORK, N. Y., A CORPORATION OF NEW YORK

MEANS FOR PERFORATING CONTAINERS

Application filed January 25, 1930. Serial No. 423,508.

This invention relates to the perforating of the wall of a container to arrange an opening therein through which to empty the contents of the container, or when the contents of the container comprises a liquid for the insertion of a tube to drink the contents from the container through the inserted tube, and while it is particularly adapted for the perforating of the wall of paper containers wherein the open end is closed by collapsing the same, that is, squeezing together opposite wall portions of the opening and secured in such condition, it is also applicable for the perforating of the wall of containers of other form and made of other material, such as metal.

It is the object of the invention to provide an improved method of and means for perforating the wall of a container to form an opening therein by a movement of such means and the container relative to each other, or one relative to the other, and to provide means for this purpose which is cheap to manufacture, easy to clean and efficient in use.

It is a further object of the invention to provide a tool or implement for perforating and making an opening in a container which is operative by the piercing of the wall of the container and entering of the tool into the container by continuing the piercing operation and thus making an incision therein, and simultaneously with the incising of the material deflecting or bending the portion bounded by the incision outwardly from the container and thus preventing contamination of the contents of the container by foreign matter which may have accummulated on the exterior of the container.

The invention is adapted for use in schools, fountains, lunch rooms and the like, and may be in the nature of a fixture on the wall for use by customers to perforate containers, or it may be mounted on a dispensing counter for use by an attendant in perforating containers, and may be arranged so that the operation of perforating a container is effected by a movement of the container in a direction toward the perforating means, or the container may be positioned relative to the perforating means and said means actuated by the container to perforate the same, which may be effected by hand or mechanically actuated means. In the use of the perforating means by dispensers of liquid refreshments in containers in amusement parks the perforating means is arranged as a portable hand device for the perforating of containers by the dispensers thereof.

In the drawings accompanying and forming a part of this application Figure 1 is a perspective view of an embodiment of my improved container perforating means fixedly mounted on a support, which may be in the nature of a plate or a hand device, and a container in relation thereto to show the method of piercing, incising and deflecting the portion of the container bounded by the incision outwardly from the container.

Figure 2 is a side elevation, on an enlarged scale, of the perforating means and the upward portion of the support therefor and showing a container positioned relative to the perforating means preparatory to the container and perforating means being moved relative to each other, or one relative to the other, to enter the perforating means into the container and form an opening therein.

Figure 3 is a view similar to Figure 2 but showing the container and perforating means as having been moved relative to each other, or one relative to the other, and the perforating means entered into the container through the wall thereof, and the manner of deflecting the severed portion of the container wall outwardly from the container.

Figure 4 is a perspective view of the perforating means and looking at one side and the deflective surface thereof.

Figure 5 is a perspective view of a shield to be extended over the perforating means to prevent injury to the user by the perforating means.

Figure 6 is an elevational view of the perforating means looking at the inner side thereof.

Figure 7 is a sectional view taken on the line 7—7 of Figure 6 looking in the direction of the arrows.

Figure 8 is a perspective view showing a modification and embodying a support for a container and the perforating means mounted on the support to have movement toward a container on the support to perforate the same; and Figure 9 is a perspective view of a container showing the same provided with an opening therein by my improved perforating means and a tube engaged therein to drink the contents of the container.

In the embodiment of the means for carrying out the invention there is provided a tool or implement 10 constructed from a metal bar, preferably steel, of rectangular shape in cross section, said implement or tool embodying a shank in a working part adapted to pierce and incise or cut the material or a container wall as it is entered thereinto. For this purpose said working part is of triangular shape in cross section and tapers from intermediate the ends of the bar to a point at the end. The one side 11 between the angles 12, 13 is arranged of arcuate shape in longitudinal section and the angle 14 is formed by the sides 15, 16 converging from the angles 12, 13. The vertex of the angle 14 extends in a plane parallel with the axis of the tool, while with the vertex of the angles 12, 13 conform to the curvature of the side 11 and are arranged as cutting edges. The tool or implement is mounted upon a suitable support to readily remove the same for cleaning purposes, sharpening or substituting of another tool, this support being shown in the form of a plate or board 17 having openings 18 for the engagement of means to mount the board upon a wall or counter in schools, fountains, lunch rooms or the like. The tool is mounted upon the support by a dowel pin 15 fixed in the board centrally adjacent the top with an end projecting from the face of the board for engagement in a perforation 20 in the tool shank, and the tool is secured to the board by a headed screw or bolt 21 extended from the back through an opening in the board and an opening 22 in the tool with a thumbnut 23 threaded thereon at the outer side of the tool. The vertex of the angle 14 of the tool is spaced from and extends in parallel and opposed relation to the face of the board for which purpose a portion of the shank and working part of the tool is undercut, as at 24, so that a portion of the inner side of the tool shank projects beyond the vertex of angle 14, and when the tool is mounted on the board is in abutting relation to the face of the board with the arcuate side 11 at the outer side, as clearly shown in Figures 2 and 3. To adapt the perforating means as a hand device the opposite side edges of the board are recessed, as indicated in dotted lines at 28 in Figure 1, whereby the board may be held in the hand grasped between the palm and fingers. The tool is particularly adapted for perforating the side wall of a container C embodying a tubular body having a disk secured in one end to constitute the bottom and the opening at the top closed by collapsing said end of the container by squeezing or pressing together the opposite wall portions of the container at the opening, as at 25, and secured inclosed condition by a metallic strip of inverted V shape in cross section engaged over the collapsed container and clamped thereto, said strip being longitudinally fluted in clamping the same upon the container, as at 26.

In the use of the perforating means with the supporting board secured upon a wall or counter to perforate the wall of a container the one side of the container is positioned against the face of the supporting board, as at 29 in Figures 2 and 3, and the container moved into the space between the working part of the tool and the board until the securing strip 26 on the end of the container abuts against the shoulder of the tool formed by the undercut 24. By so positioning and moving the container the opposite wall thereof will extend at an angle to and intersect the plane of the tool, and as the end of the container is moved relative to the tool the pointed end of the tool will first pierce the wall of the container and by the continued movement of the container the tool is entered into the container the cutting edges 12, 13 incising or cutting the material of the container and making a V shape incision therein, and due to the arcuate form of the side 11 between the cutting edges the material of the container bounded by said incision will be deflected or bent laterally and outwardly from the container, as shown at 30, when the container is withdrawn from between the tool and supporting board and the container will be provided with an opening of V shape through which the contents of the container may be emptied by tilting said end of the container downward, or a tube or straw 30 may be inserted through said opening into the container, as shown in Figure 9, to withdraw the contents from the container through said tube. It will be obvious that when the perforating means is used as a hand device that the tool and container may be moved relative to each other, or one may be moved relative to the other, in the operation of perforating the container.

To prevent the hand from coming into contact with the pointed end or cutting edges of the tool as the container is perforated with possible injury to the hand, a guard is provided, which is in the form of a plate 32 of reduced width at one end and at which end it is secured in juxtaposed relation to the tool by arranging perforations 33, 34 therein for the engagement of the dowel pin 19 and securing screw 21 for the tool upon the support, the plate being interposed between the tool and thumb nut 23. The end 35 of greatest width extends over and beyond the end of the tool and is offset outward from the tool to prevent the same from interfering with the positioning of the container relative to the support with the wall to be perforated at an angle to and intersecting the plane of the tool, and the movement of the tool or container one relative to the other to effect perforation of the container by the tool.

Instead of fixedly mounting the perforating tool upon the support it may be movably mounted thereon to effect perforation of a container by movement of the tool on the support. An embodiment of the movable mounting of the tool on the support is shown in Figure 8, wherein the tool is mounted intermediate the ends of a lever 36 by means of the dowel pin 19, screw 21 and the thumb nut 23. The lever is pivotally supported at one end, as at 36', at one side and adjacent the top of the supporting board to extend transversely of the board and interposed between the board and tool, the opposite end projecting from the opposite side of the support and being arranged as a hand grip. To position a container as described having opposite wall portions inclined from the bottom to the top relative to the support with the wall to be perforated inclined to and intersecting the plane of the tools the support is provided with a shelf 37 upon which to set and support the container, said shelf being inclined at an angle less than a right angle to the board whereby the one inclined wall of the container will lie contiguous to and extend in the plane of the face of the board with the opposite side of the container extending in a plane to intersect the plane of the movement of the tool. To gauge the container relative to the tool so that the perforation in the container will be substantially midway between the sides of the collapsed container end, the support is provided with a side member 38 against which the container on the shelf is positioned preparatory to the perforating of the same. The movement of the tool toward the container on the shelf 37 being limited by the lever engaging a pin 39 fixed in the support 17.

Instead of the support 17 and working portion of the tool being arranged in parallel spaced relation for the engagement of the portion of the container to be perforated, the board may be arranged to extend in angular relation to the longitudinal plane of the tool, or the tool may be inclined relative to the face of the support. Such an arrangement is particularly adapted for the perforating of containers having the same cross sectional dimension for the entire length thereof in order to either position the wall of the container to be perforated in angular relation to the tool, or the tool in angular relation to the container wall, whereby as the container or tool is moved one relative to the other the tool will pierce and be entered into the container wall, and by the structure of tool described not only making on incision in the container wall but also deflecting the material bounded by the incision outwardly from the container.

It will be obvious that various modifications may be made in the construction and arrangement of parts, and that portions of the invention may be used without others without departing from the scope of the invention.

Having thus described my invention, I claim:

1. In means for perforating containers, a piercing and incising tool, and a support for the tool, said support being adapted to position the container with the wall to be perforated at an angle intersecting the longitudinal plane of the tool.

2. In means for perforating containers, a support, a piercing and incising tool fixedly mounted on said support with the working part of the tool extending in spaced relation thereto, and the container adapted to be positioned relative to the support with the wall thereof to be perforated extending at an angle to and intersecting the plane of the tool as it is entered into the container wall.

3. In means for perforating containers, a support for the container, a piercing and incising tool mounted an said support to have movement toward and away from a container on the support, said support being arranged to position a container thereon with the wall to be perforated extending at an angle to and intersecting the plane of movement of the tool.

4. In means for perforating containers having the open end and collapsed by squeezing together opposite wall portions at the open end of the container to close the same, a piercing and incising tool, and a support on which the tool is mounted with the working part spaced therefrom and relative to which space the collapsed end of the container on the support is positioned with the wall of the container to be perforated extending at an angle to and intersecting the plane of the tool preparatory to entering the tool into the wall of the container to perforate the same.

5. A tool for perforating the wall of a container, comprising a shank and a working part of triangular shape in cross section and tapering from the shank to the end to form a piercing point, the vertex of one angle extending in a plane parallel with the longitudinal axis of the tool, and the vertices of the other two angles arranged as cutting edges with the side between said latter two angles of arcuate shape in longitudinal section.

6. In means for perforating containers, a support, and a perforating tool of triangular shape in cross section progressively increasing in thickness from the perforating end and mounted on the support with a side between two of the angles at the outside and the vertexes of said angles arranged as cutting edges, and the sides between said two angles and the third angle diverging toward the support.

Signed at the city of New York, in the county of New York and State of New York, this 23rd day of January, 1930.

LEWIS B. WINTON.